(12) United States Patent
Fischer et al.

(10) Patent No.: US 7,077,525 B2
(45) Date of Patent: Jul. 18, 2006

(54) LED-BASED FLASHLIGHT

(75) Inventors: Robert E. Fischer, Westlake Village, CA (US); Greg Moeller, Moorpark, CA (US); Simon Prince, Newbury Park, CA (US)

(73) Assignee: Optics 1, Inc, Westlake Village, CA (US)

( * ) Notice: Subject to any disclaimer, the term of this patent is extended or adjusted under 35 U.S.C. 154(b) by 86 days.

(21) Appl. No.: 10/794,073

(22) Filed: Mar. 5, 2004

(65) Prior Publication Data

US 2005/0007767 A1    Jan. 13, 2005

Related U.S. Application Data

(63) Continuation-in-part of application No. 10/068,366, filed on Feb. 5, 2002, now Pat. No. 6,746,124.

(60) Provisional application No. 60/266,589, filed on Feb. 6, 2001.

(51) Int. Cl.
*G03B 29/00* (2006.01)
*G03B 21/14* (2006.01)
*G03B 21/20* (2006.01)
*G03B 21/26* (2006.01)
*F21L 4/02* (2006.01)

(52) U.S. Cl. .................. 353/43; 353/20; 353/31; 353/85; 353/94; 353/101; 353/102; 353/119; 353/121; 362/187; 362/188; 362/347

(58) Field of Classification Search ............ 353/43, 353/20, 30, 34, 37, 97, 121, 122, 102, 119, 353/31, 53, 98, 85, 94, 101; 362/187, 188, 362/157, 347, 184, 202

See application file for complete search history.

(56) References Cited

U.S. PATENT DOCUMENTS

| | | | | |
|---|---|---|---|---|
| 3,656,845 A * | 4/1972 | Koch-Bossard et al. | ...... | 353/42 |
| 5,871,272 A * | 2/1999 | Sharrah et al. | ............ | 362/184 |
| 6,227,669 B1 * | 5/2001 | Tiao et al. | ................... | 353/31 |
| 6,260,974 B1 * | 7/2001 | Koyama | ..................... | 353/98 |
| 6,305,818 B1 * | 10/2001 | Lebens et al. | .............. | 362/184 |
| 6,318,863 B1 * | 11/2001 | Tiao et al. | ................... | 353/31 |
| 6,517,210 B1 * | 2/2003 | Peterson et al. | ............. | 353/98 |
| 2004/0170014 A1 * | 9/2004 | Pritchard et al. | .......... | 362/202 |

* cited by examiner

*Primary Examiner*—Melissa Jan Koval
(74) *Attorney, Agent, or Firm*—Opticus IP

(57) ABSTRACT

A flashlight that utilizes an array of one or more light-emitting diodes (LEDs) as a light source, and a light pipe as a light homogenizer to generate a light beam capable of forming a uniformized light distribution at a given distance from the flashlight is disclosed. The LEDs may be all the same color, or some or all may be different colors. A switch, coupled to switching electronics coupled to the LED array, is used to change the state of the LED array to create a variety of different types of light beams, each of which provides relatively uniform and bright illumination at a given distance from the flashlight, wherein the given distance is selectable by adjusting an adjustable imaging lens.

17 Claims, 9 Drawing Sheets

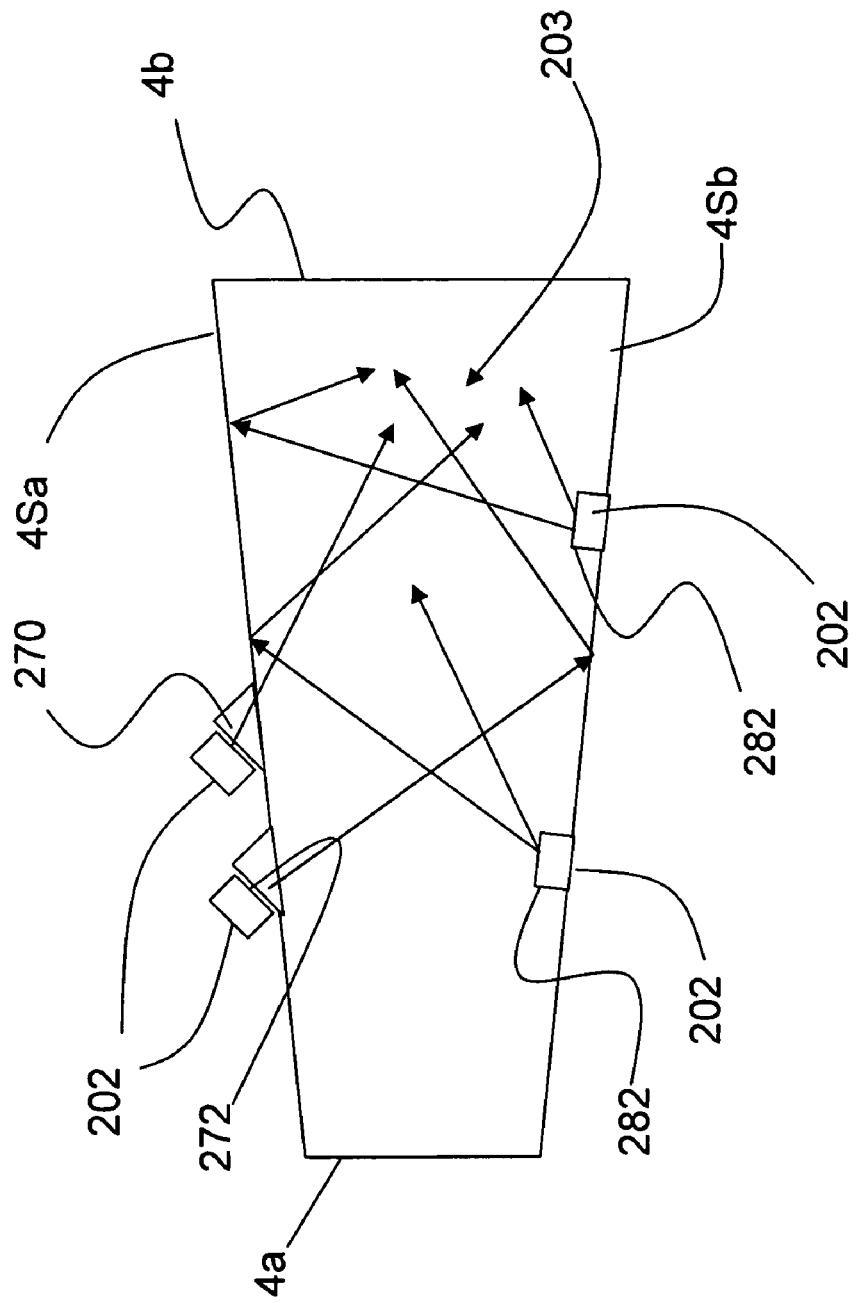

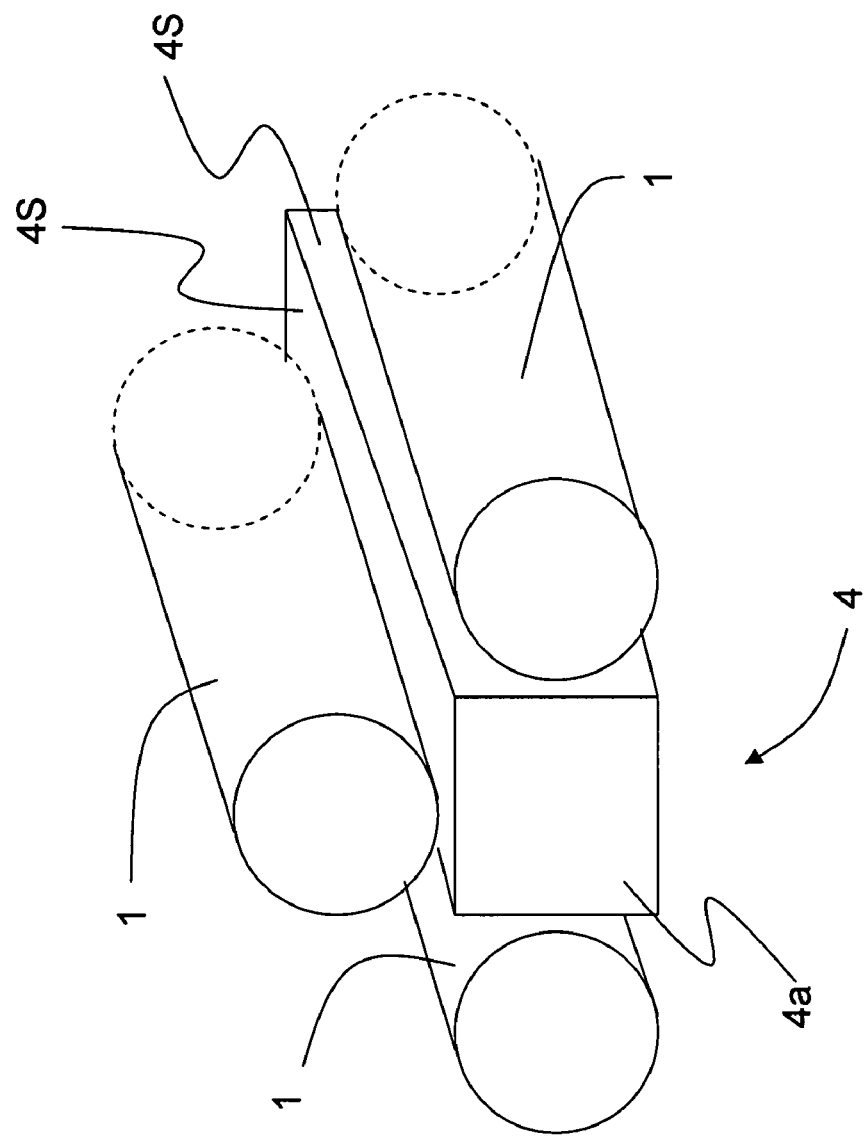

LED-BASED FLASHLIGHT

CROSS-REFERENCE TO RELATED APPLICATIONS

This application is a continuation-in-part of U.S. patent application Ser. No. 10/068,366, now U.S. Pat. No. 6,746,124, filed on Feb. 5, 2002, which in turn claims priority from U.S. Provisional Application No. 60/266,589, filed Feb. 6, 2001.

BACKGROUND INFORMATION

1. Field of the Invention

This invention relates to flashlights that utilize light-emitting diodes (LEDs) as a light source.

2. Description of the Related Art

The flashlight was invented in 1898 by Conrad Hubert who turned a metal tube, a light bulb and a battery into the world's first flashlight. Little has changed in flashlight technology since then. Today's flashlight technology is based on locating a tungsten lamp or bulb at the focus of a parabolic reflector and simply imaging the filament out into object space. The reflector may be of other shapes and may be faceted or otherwise modified. At a somewhat distant wall (such as at a distance of 3–6 feet for example) a crude image of the filament is formed.

A significant problem with the current flashlight technology is that the crude image (usually a circular spot) varies significantly in its intensity. While some flashlights permit the user to vary or adjust the size of the pattern, it is generally highly non-uniform in intensity over the spot. Another problem is that the light spills out to a wide area outside of the intended spot area.

Another problem is that the crude image cast by a conventional flashlight makes it difficult in many circumstances to clearly see the object of interest. This is because the variation in intensity over the illuminating spot can often mask or hide the features of the object of interest.

Another problem is that the illuminated area of prior art flashlights tends to be unattractive and unfamiliar. The illumination people generally experience in their daily lives is designed to be reasonably uniform and have sufficiently high brightness so that objects can be readily seen without eye strain. Unfortunately, conventional flashlights do not provide such illumination.

SUMMARY OF THE INVENTION

A first aspect of the invention is a flashlight for uniformly illuminating an object to be viewed. The flashlight includes a light pipe having an input face and an output face, and an array of one or more light-emitting diodes (LEDs) optically coupled to the input face of the light pipe. The flashlight also includes an imaging lens arranged adjacent the light pipe output face and at an output end of the flashlight. The imaging lens is adjustable so that a relatively uniform distribution of light is formed at a selectable distance from the end of the flashlight.

A second aspect of the invention is a method of forming a flashlight beam. The method includes generating light from one or more LEDs, coupling the light into the light pipe, and outputting uniformized light at an output face of the light pipe. The method also includes collecting the outputted light from the light pipe with an imaging lens and directing the outputted light as a flashlight beam. The distance at which the flashlight beam forms a uniform image is selectable by adjusting the adjustable imaging lens.

BRIEF DESCRIPTION OF THE DRAWINGS

FIG. 6 is a close-up cross-sectional view of an example embodiment of a light pipe of the present invention, wherein the light pipe includes prisms formed on one side of the light pipe, and cavities formed on another side, and wherein the prisms are adapted to interface with LEDs, and wherein the cavities and prisms are adapted to facilitate coupling light from the LEDs into the light pipe;

FIG. 8 is a perspective input-face-end view of the light pipe illustrating an example embodiment wherein the batteries are arranged to at least partially surround the sides of the light pipe.

DETAILED DESCRIPTION OF THE INVENTION

For the purposes of explanation, specific embodiments are set forth to provide a thorough understanding of the present invention. However, it will be understood by one skilled in the art, from reading the disclosure, that the invention may be practiced without these details. Moreover, well-known elements, process steps, and the like, and including, but not limited to, optical components, electronic circuitry components and connections, are not set forth in detail in order to avoid obscuring the disclosed system.

Figure 1:
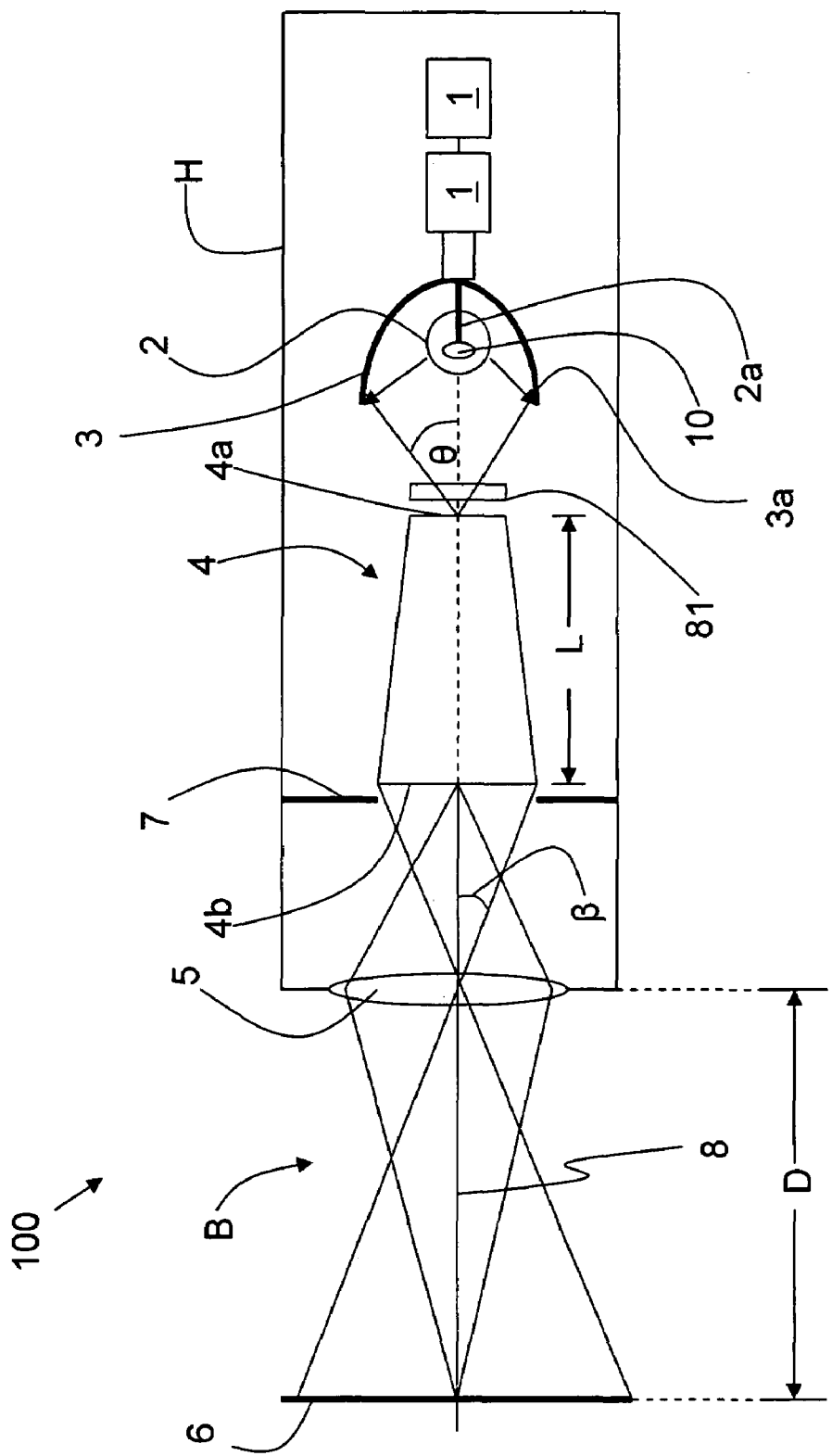
FIG. 1 is schematic cross-sectional diagram illustrating an embodiment of the flashlight of the present invention, wherein the flashlight has a light pipe, and showing the path of the light from the light source to the final image.

The preferred example embodiment of the flashlight invention 100 is shown in FIG. 1. Flashlight 100 includes a housing H which serves to enclose and/or support and protect the various elements making up the flashlight as described below. Two ordinary flashlight batteries 1 are shown in flashlight 100 of FIG. 1, but any number of batteries (i.e., one or more), or types of batteries, or any applicable power source will work as a power source for a conventional or ordinary flashlight bulb 2. The bulb 2 is located nominally at one focus 10 of an elliptical reflector 3 as shown. Instead of reflecting the light out directly from an elliptical reflector to the object or wall 6 as with prior art flashlights (not shown), where all the light from elliptical reflector is directed along a path substantially parallel to the optic axis, this embodiment of a flashlight 100 uses the same bulb filament 2a, but, reimages the light via an elliptical reflector 3 into the input aperture or input face 4a of a tapered light pipe 4.

To achieve this redirection into input face 4a, the light reflecting off reflector 3, is reflected at various angles to optic axis 8, depending on the particular location doing the reflecting on the elliptical reflector 3, such that all of the reflected light enters light pipe 4 at input face 4a, and where the outer cone angle θ is defined by the light reflecting from the outer edge 3a into input face 4a. After entering light pipe 4, the light reflects off the walls of light pipe 4 until such reflected light exits light pipe 4 through output aperture or output face 4b. The output from the light pipe is now reimaged by an imaging lens 5 to form a flashlight beam B, which is directed (i.e., focused) by the imaging lens onto the object plane or surface 6 at some distance D in front of the flashlight. If the lens 5 is of reasonable quality, the image of the output of the light pipe 4 will be a sharp and well-defined image of the edge of the light pipe 4. By adjusting the focus of the lens 5, or in other words its location along the optical axis 8, the image of the output of the light pipe 4 can be changed to any desired distance.

One well-known property of a light pipe 4 is that the light exiting the pipe at output face 4b, where the light pipe 4 is sufficient in length L, will be extremely uniform in brightness. This uniform brightness is due to the mixing or homogenization within the light pipe which is a result of multiple reflections within the length of the pipe. Another property of the light pipe 4, being tapered from a small square at the input face 4a to a larger square at the output face 4b, is that the cone angle θ of light incident will be transformed at the output face 4b so that the included angle of the cone decreases from an angle θ to an angle β as the output face 4b gets larger than the input face 4a (as shown), or conversely. During this transformation, the etendue is preserved. Here, the high numerical aperture of the light cone (meaning a large cone angle θ) of light incident to input face 4a is reduced in its cone angle to an angle β at the output face 4b in concert with an increase in the area at the output face 4b of the pipe 4. This transformation follows the relationship that the light pipe area times the solid angle of the light cone is constant, whether it is on the entrance side or the exit side. For a non-tapered light pipe (not shown), the numerical aperture entering the light pipe is maintained at the exit face of the pipe so that light entering at a given angle will exit the light pipe at the same angle.

Masks 7 of differing shapes and sizes can be located at the output face or surface 4b of the light pipe 4 so as to define, as desired, the shape of the pattern of light at the object 6. Thus a mask 7 could have the shape of a circle, an ellipse, a star, or any other desired shape. As such, the pattern of light can be modified, i.e., made larger, smaller, or have its shape changed, without effecting its uniform properties. Furthermore, any other light modifying component or surface can be located at the output face 4b of the pipe 4 such as an image or picture on a piece of film or transparency, for example, and this would be projected onto the object 6.

The uniqueness of this invention is the ability to take an old technology light source such as an extremely low cost flashlight bulb 2, in combination with a simple reflector 3, and create an extremely uniform and bright pattern or disc of light instead of the prior art type of flashlight which provides a very non-uniform and non-descript patch of light at the object 6. In other words, this invention provides a higher level of light or photon efficiency using existing technology flashlight bulbs 2. This has been one of the common problems of flashlights for many, many years, and through this invention we have finally solved this problem.

In other example embodiments, the reflector used to image the bulb filament 2a onto the light pipe 4 is a shape other than elliptical. Also the reflector can include facets or other surface treatments.

In the present invention, the light pipe need not be tapered, and in certain embodiments the input and output faces may be of the same size and area. Further, the light pipe may take on other shapes other than the square design of the preferred embodiment, such as circular, triangular, rectangular and the like.

In another embodiment of the invention, the image of the bulb filament is defocused from the entrance face of the light pipe. In addition a diffuser 81, which may be a holographic form of diffuser, is located at the entrance face of the light pipe. The combination of the defocused image of the filament and the diffuser at the entrance face of the light pipe produces a larger bright area or patch of light than with a focused filament image and no diffuser. The net result is that the uniformity is improved at the output face of the light pipe because the "kaleidoscoped" light patterns are more filled in than with a focused filament image.

Further, it is possible to take the output of the light pipe and locate or position a circular rod of glass to act as a solid circular light pipe whose output then would now be imaged to the object.

Another embodiment of the current invention would use a so-called "CPC" or "Compound Parabolic Concentrator" whose input aperture or face would be located at the focus of the ellipse. The output of the CPC would be a circular disc of light whose cone angles are well defined, and could be very easily imaged on to the object. In this embodiment we are simply replacing the tapered light pipe with a CPC.

The light source does not necessarily have to be a filament lamp 2. For example, it could alternatively be a form of light emitting diode or LED, or potentially a laser source which would need to be transformed into a cone of light or otherwise imaged into the input of the light pipe. The source could also be an arc lamp such as a xenon lamp, or any other source of light.

Figure 2:
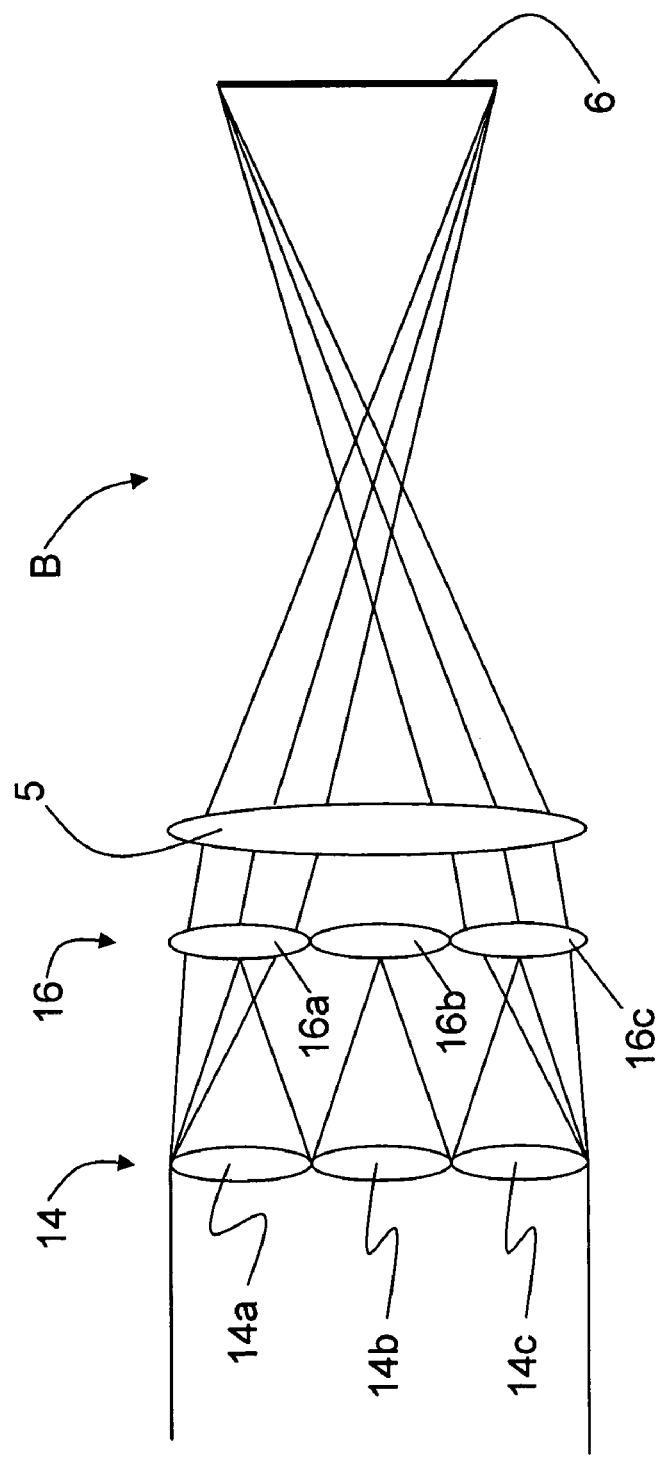
FIG. 2 is close-up schematic diagram showing a side view of an embodiment of the flashlight of the present invention, wherein the flashlight includes two sets of lens arrays, and showing the path of the light as it travels through the lens arrays to the final image.

Furthermore, as shown in FIG. 2, a uniform pattern of light may also be achieved, i.e., homogenization, by using lens arrays to convert non-uniform light distributions into more uniform light patterns or images. This technique may be used in conjunction with typical non-uniform flashlight output to produce a uniform image. It is also contemplated that existing flashlights could be retrofitted with appropriately designed lens arrays to achieve a more uniform light pattern. Lens arrays 14 and 16, unlike standard lens 5, contain more than one lens, or lenslet 14a–14c, in a single optical medium 14. However, the lenslets need not exist in the same optical medium 14, but need only be located along the path of light extending from the light source. Lens arrays are typically described by the number of lenslets they contain. For example, a 4×4 array is a single optical medium having 16 lenslets arranged 4 high and 4 wide. It is contemplated that lens arrays can be employed in any of the following designs: a single set of lens arrays 14, a pair of lens arrays 14 and 16, or any number of lens arrays. Where such multiple sets of arrays are used, for example a pair of arrays 14 and 16, the first lens array 14 would be used to sample, or receive, the non-uniform output from a light source.

Each lenslet 14a–14c of the first array focuses a portion of the beam into the aperture of a second array of lenslets 16a–16c. The elements of the second array image the aperture of the elements of the first array into a uniform pattern of light on a distant plane 6, or where more than two sets of arrays are used 14 and 16, the last set of lens arrays 16 performs the final imaging before standard imaging lens 5 focuses the reimaged light on object 6. Regardless of the number of arrays used, the resulting image at the particular plane or object 6 is the product of the superposition of multiple images. By using lens arrays 14 and 16 it is possible to zoom the size of the distant plane 6 by moving the lens arrays 14 and 16 relative to one another. It is contemplated that such relative movement of multiple lens arrays allows the size of the image to be increased by up to at least a factor of three.

LED Array Embodiments

Figure 3:
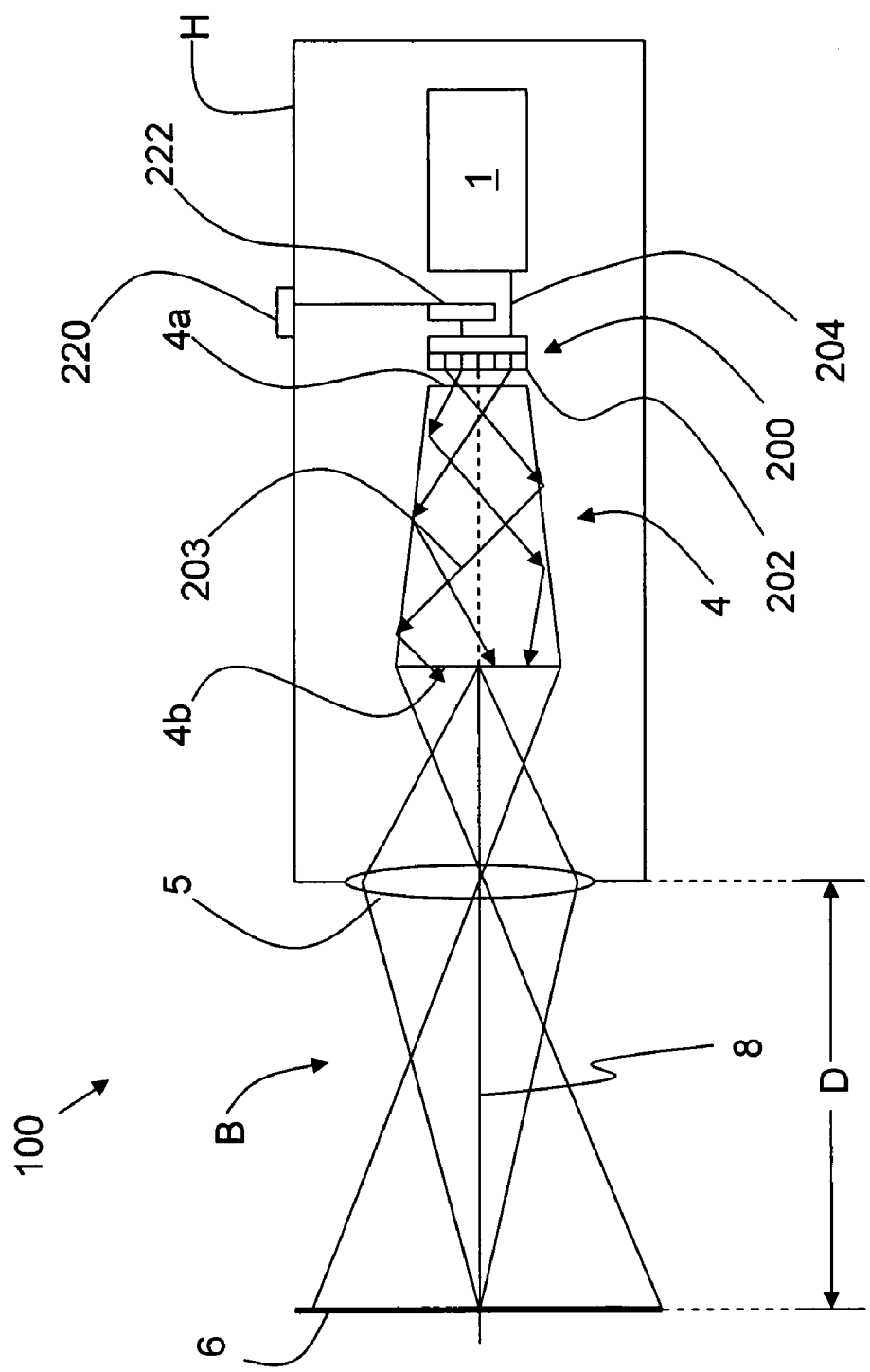
FIG. 3 is schematic cross-sectional diagram similar to FIG. 1, but illustrating an example embodiment wherein the flashlight has an array of LEDs as its light source.
Figure 4:
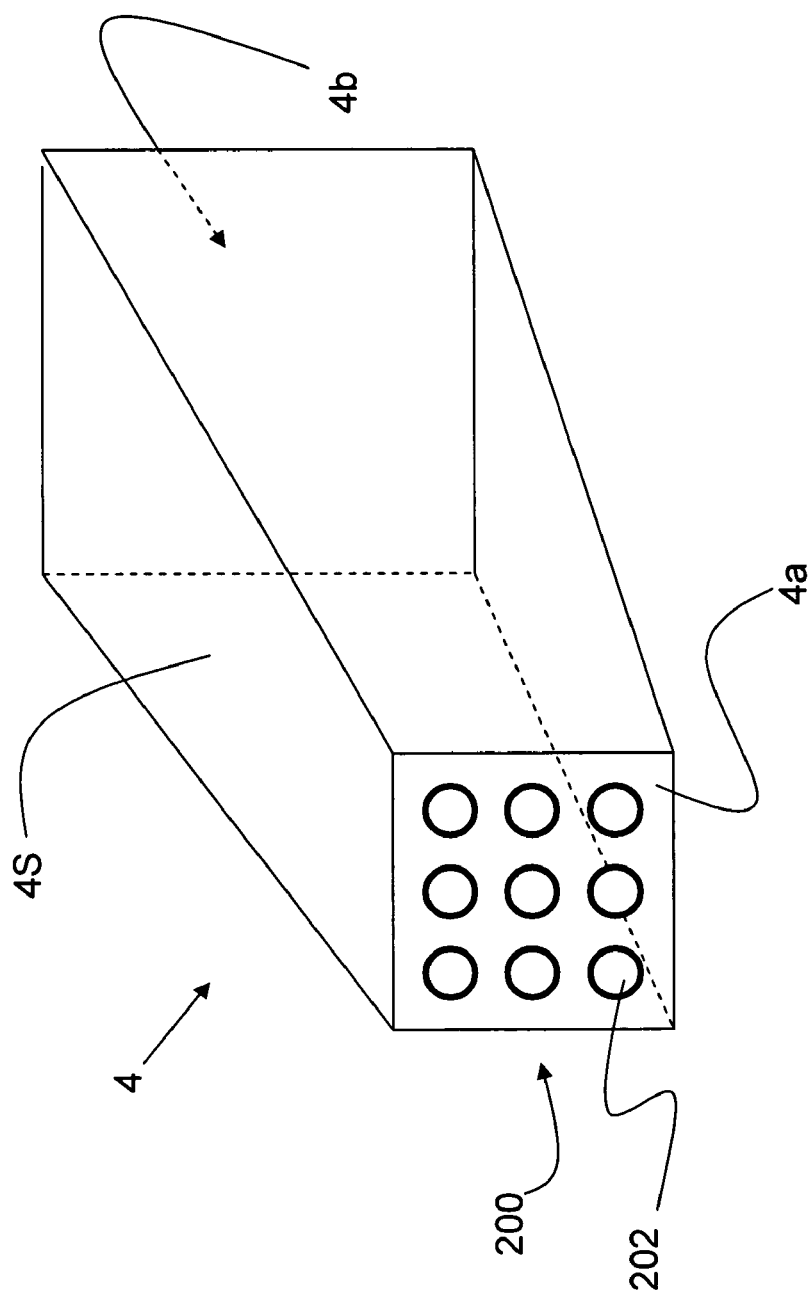
FIG. 4 is a close-up, perspective, input-face-on view of the light pipe of the embodiment of FIG. 3, illustrating an example arrangement of the LEDs at the light pipe input face.

FIG. 3 is a schematic cross-sectional diagram of an example embodiment of flashlight 100 similar to that of FIG. 1, but having an LED array 200 arranged adjacent light pipe input face 4a. FIG. 4 is a close-up perspective view of the LED array and light pipe 4. LED array includes one or more LEDs 202, each of which emits light 203. In an example embodiment, LED array 200 is a square array of 2×2, 4×4, etc. LEDs In another example embodiment, LED array 200 consists of a single LED 202. In another example embodiment, the LED array 200 includes a plurality of LEDs having a rectangular or other polygonal arrangement. Suitable LEDs for the present invention can be obtained from a number of suppliers, such as Advanced Photonics, Inc., of Camarillo, Calif., or Lumileds Lighting, LLC, of San Jose, Calif.

LED array 200 is operably coupled to batteries 1 via an electrical connection 204. Batteries 1 provide the energy necessary to activate (turn on) and power the LEDs and generally represent any type of suitable power supply. The LEDs are arranged relative to light pipe input face 4a so that light 203 emitted from the LEDs is coupled into light pipe 4. In an example embodiment, LED array is optically cemented or otherwise bonded directly to input face 4a.

In an example embodiment, LEDs 202 are die-level rather than packaged (i.e., encapsulated in a plastic housing having a plastic lens). Packaged LEDs can be used in the present invention, but the optical coupling between the light pipe and a packaged LED tends to be less efficient than that for die-level LEDs.

The larger the number of LEDs 202 in array 200, the greater the brightness and uniformity of image 6. Because all or all but one of the LEDs 202 are off-axis relative to axis 8 (depending on the LED array geometry), light 203 from the LEDs undergoes a kaleidoscopic effect wherein the light from each LED is rotated and superimposed at light pipe output face 4b. This rotation and overlapping further increases the uniformity of image 6 when the light pipe output face is imaged by imaging lens 5.

Colored LEDs Embodiments

With continuing reference to FIGS. 3 and 4, in an example embodiment, LEDs 202 in LED array 200 are different "colors," i.e., they output different wavelengths of light. In a more specific example embodiment, the LED colors are red, green and blue. By way of example, LED array can be a 3×3 array having 3 blue LEDs, 2 green LEDs and 4 red LEDs. By using or activating the appropriate number of red, green and/or blue LEDs, flashlight 100 is capable of generating light beam B of virtually any color.

To this end, in an example embodiment, flashlight 100 includes a switch 220 accessible to a user (not shown) of the flashlight. For example, the switch can be located on the flashlight housing H, as shown. Switch 220 is operably coupled to the LED array, which is adapted to receive input signals from the switch and selectively activate some or all of the LEDs to create a light beam of a chosen color and brightness. In an example embodiment, switch 220 is electrically coupled to an electronic switching circuit 222, which in turn is electronically coupled to LED array 200. The selective activation of LEDs 202 via switch 220 (i.e., changing the state of the LED array by switching on or off one or more of the LEDs) to create a desired light beam B (or no light beam at all) obviates the need for attaching filters to the flashlight to obtain a light beam B of a particular color.

By way of example, for a flashlight user who needs to read a document (e.g., a map) at night, the user can select via switch 220 the setting that activates the red LEDs, or even a subset of the red LEDs, while adjusting imaging lens 5 so that image 6 is formed at a distance D corresponding to the location of the document to be read, such as a map. This allows the user to read the document while also maintaining his or her night vision to perform other tasks. The user also has the choice to then activate some or all of the LEDs to create a white light beam (if such a beam is desired), and to re-adjust imaging lens 5 to form image 6 a different distance D—say, to read a house number of a house (not shown) located tens of feet away from the user.

Further, in another example embodiment of the use of flashlight 100, the user can operate switch 220 to turn off all of LEDs 202 with the exception of one off-axis LED, e.g., an LED at the corner of array 200. This single LED, which is also at a corner of the input face 4a of light pipe 4, will still produce uniform light at light pipe output end 4b because of the above-mentioned kaleidoscopic effect.

In an example embodiment of the present invention, any distribution of activated/inactivated (on/off) LEDs produces a very uniform, bright light patch (distribution) at light pipe output face 4b, as well as very uniform, bright image 6 at distance D. The degree of uniformity in image 6 depends on the number of "bounces" of the light from the LEDs take within the light pipe, as well as on the number of LEDs 202 in array 200. Also, the degree of brightness in image 6 formed by flashlight 100 also depends directly on the number of LEDs present (or, more particularly, the number of LEDs activated) in array 200.

In an example embodiment, switching circuit 222 is adapted to cause one or more LEDs 202 to flash when the proper signal is initiated by a user via switch 220. For example, LED array 200 can be made to cause certain (e.g., red) LEDs 202 to flash on and off for emergencies.

Thus, in the present embodiment of flashlight 100, it is apparent that a number of different types of light beams B (e.g., different colors, brightnesses, flashing patterns, etc.) can be formed, wherein each such light beam B in turn forms a uniform, bright image 6 at a distance D selected by adjusting imaging lens 5.

Embedded LED Embodiments

It is preferred that light 203 generated by LED array 200 be efficiently coupled into light pipe 4. LED dies are known to emit light efficiently over $2\pi$ Steradians. Thus, it is advantageous to arrange the LEDs as close as possible to light pipe input face 4a so that as much light as possible is collected. .

Figure 5A:
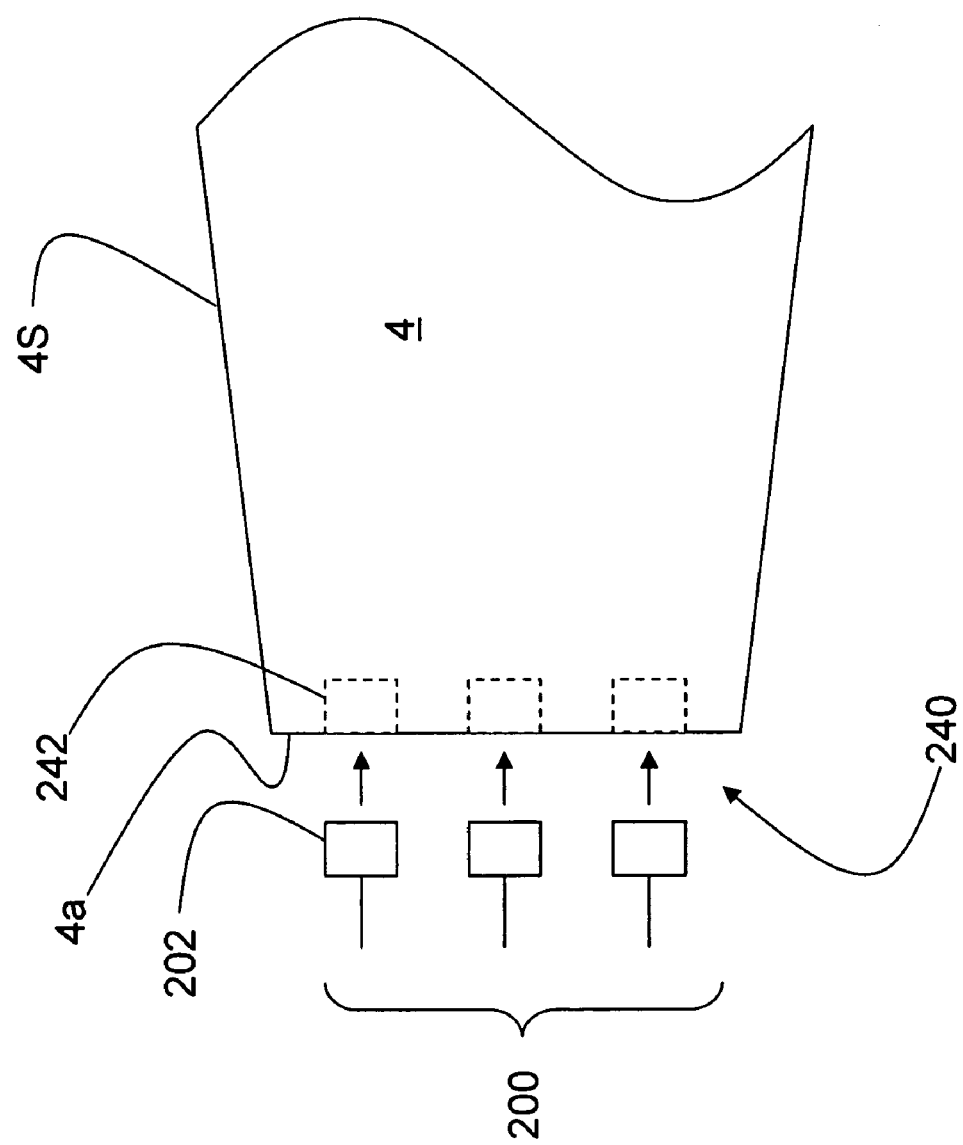
FIG. 5A is a close-up side partial exploded view of an example embodiment of the light pipe of the present invention wherein the input face includes an array of cavities sized to accommodate the LEDs in the LED array.
Figure 5B:
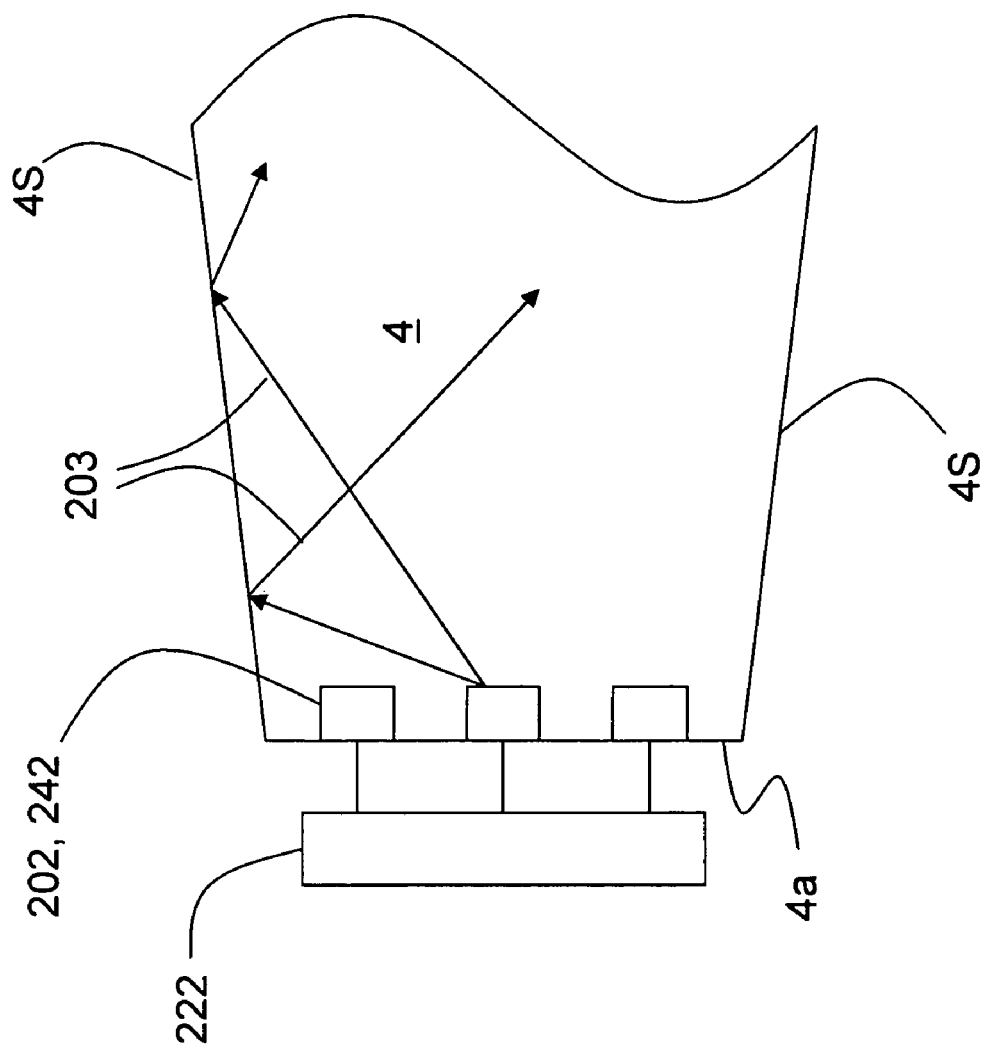
FIG. 5B is a close-up side view similar to FIG. 5A, but showing the LEDs arranged in the respective cavities and thus embedded in the input face of the light pipe.

FIGS. 5A and 5B are close-up side views of an example embodiment of light pipe 4, wherein the input face 4a includes an array 240 of cavities 242, wherein each cavity is sized to fit an LED 202. In FIG. 5A, the LEDs are shown adjacent the cavities for ease of illustration. In FIG. 5B, the LEDs are shown in the cavities, i.e., embedded in the light pipe at input face 4a. In a preferred embodiment, LEDs 202 are dies, though packaged LEDs can be used in this embodiment, albeit less effectively.

As illustrated in FIG. 5B, because at least a portion of each LED resides within (i.e., is at least partially embedded in) the light pipe, more of the light emitted by each LED is captured by the light pipe and relayed to output face 4b than when the LED is external to the light pipe. This, in turn, results in brighter and more uniform distribution of light at output face 4b, and in turn, at image 6.

FIG. 6 is a cross-sectional view of another example of an embodiment of light pipe 4. In this particular example embodiment, two of light pipe sides 4S are identified as 4Sa and 4Sb for the sake of illustration. In one example, side 4Sa includes prism-like protrusions ("prisms") 270 attached to or formed integral with the light pipe side. Prisms 270 have a face 272 to which an LED 202 is coupled (e.g., bonded or optically cemented). This allows for light to be injected into light pipe 4 from the side 4Sa rather than from or in addition to inputting light at input face 4a.

FIG. 6 also illustrates an example embodiment wherein light pipe 4 includes cavities 282 formed in side 4Sb, wherein the cavities are sized to accommodate respective LEDs 202 so that the LEDs are embedded in the light pipe. In this manner, light 203 from the LEDs is coupled into light pipe 4 from side 4Sb rather than or in addition to inputting light at input face 4a and/or side 260a.

As discussed above in connection with FIG. 3, in an example embodiment the LEDs 202 of FIG. 6 are also electrically connected to electronic switching circuit 222, which in turn is connected to switch 220 so that the LEDs can be selectively activated and deactivated. Likewise, the LEDs 202 in FIG. 6 can be all of the same color or have different colors.

Light Pipe Assembly Embodiments

In an example embodiment of the present invention, two or more light pipes are coupled to one another or multiplexed to enhance optical uniformity and brightness. In an example embodiment, this is achieved by preserving the etendue by launching the maximum solid angle of light into reach respective light pipe.

Figure 7:
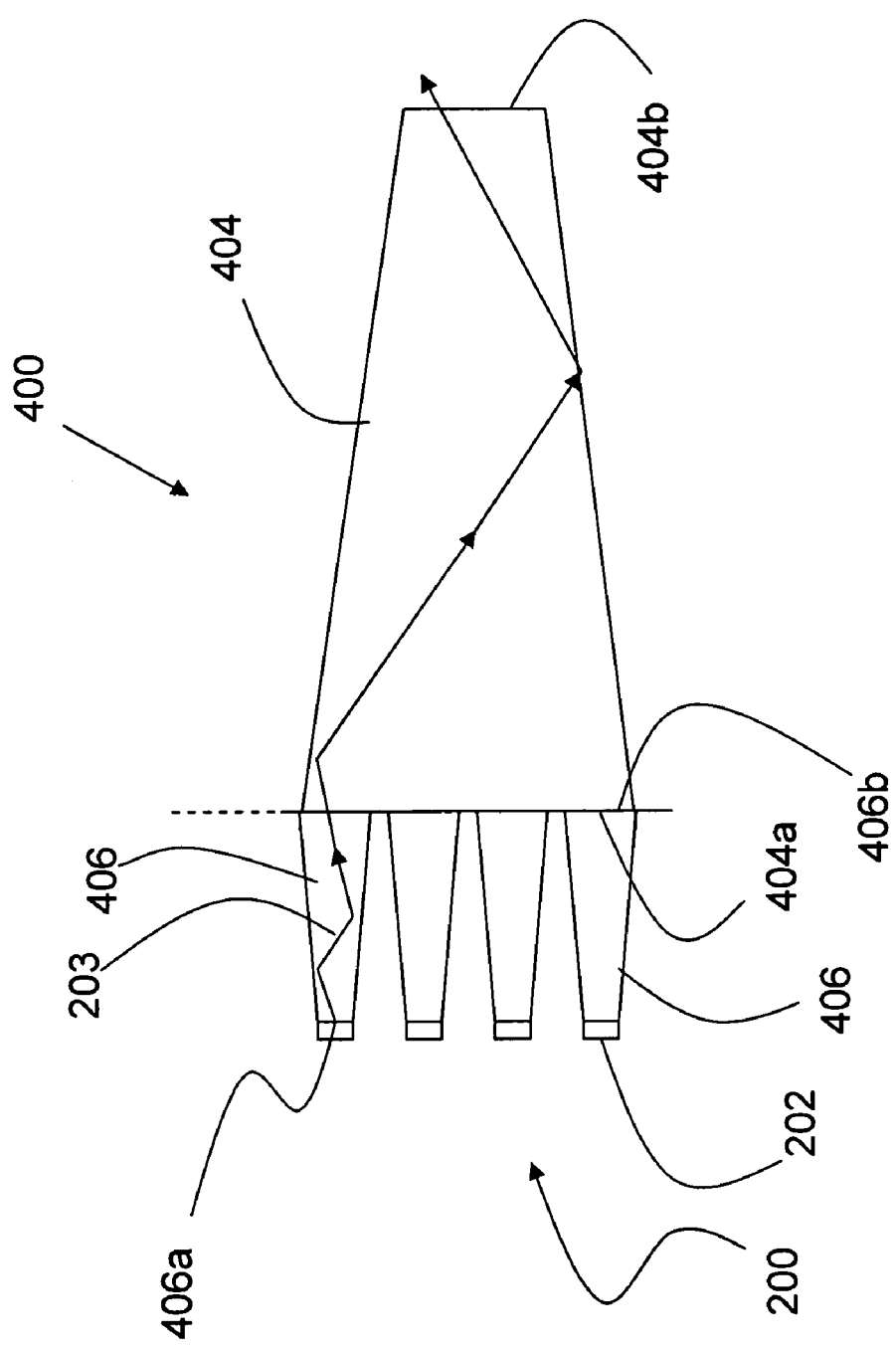
FIG. 7 is a side view of an example embodiment of a light pipe assembly that includes an array of secondary light pipes coupled to the input face of a main light pipe.

FIG. 7 is a side view of an example embodiment of a light pipe assembly 400 that allows for efficient coupling of light from the LEDs. Light pipe assembly 400 includes a main or "first" light pipe 404. Main light pipe 404 may have a variety of shapes (e.g., tapered or straight walls, rectangular, square or other polygonal or circular cross-section, etc.) and in an example embodiment is essentially the same as light pipe 4 (FIG. 3). Main light pipe 404 has an input end 404a and an output end 404b.

In the example embodiment of FIG. 7, light pipe assembly 400 includes an array of one or more secondary light pipes 406 each smaller than the first light pipe and having an input end 406a and an output end 406b. In FIG. 7, an array of four light pipes 406 is shown for the sake of illustration. The secondary light pipes 406 are coupled to or formed integral with the first light pipe 404 so that the output ends 406b of the secondary light pipes are interfaced with input end 404a of the first light pipe. In this sense, the secondary light pipes are multiplexed with the first (main) light pipe.

In an example embodiment, secondary light pipes 406 are tapered so that output ends 406b are larger than input ends 406a. Where the secondary light pipes are formed integrally with the first light pipe, the output ends 406b of the secondary light pipes and the input end 404a of the first light pipe are defined by a fictitious surface 409 (dashed line) representing where the light exits the secondary light pipes and enters the first light pipe.

With continuing reference to FIG. 7, each secondary light pipe 406 includes one or more LEDs coupled (e.g., bonded or optically cemented) to its input end 406a. Thus, input ends 406a collectively serves the same purpose and correspond to input face 4a of light pipe 4 (FIG. 3).

In operation, light 203 from each LED 202 is scrambled in each secondary light pipe 406 to form a relatively uniform light distribution at output faces 406b. This uniformized light then proceeds into main light pipe 404. Each of output ends 406b acts as a uniformized light source, which further uniformized by the kaleidoscopic effect of first light pipe 404. This results in a high level of uniformity at main light pipe output end 404b.

In light pipe assembly 400, in an example embodiment LEDs 202 are separated from each other, which is advantageous for packaging and managing the thermal output of the LEDs (as technology progress and the output power of LEDs increases, managing the thermal budget of LEDS in compact optical systems will become increasingly more difficult). Also, light pipe assembly 404 has the advantage that it is typically easier to align individual LEDs to an input end of a small light pipe 406 than to align an array of LEDs to an input face of a single, larger light pipe.

As discussed above in connection with FIG. 3, in an example embodiment the LEDs 202 of FIG. 7 are also electrically connected to electronic switching circuit 222, which in turn is connected to switch 220 so that the LEDs can be selectively activated and deactivated. Likewise, the LEDs 202 in FIG. 7A can be all of the same color or have one or more different colors.

Note that the example embodiment of main light pipe 404 shown in FIG. 7 is tapered. However, in other example embodiments, the main light pipe can be untapered.

Battery Arrangement

FIG. 8 is perspective view of light pipe 4 showing an arrangement wherein three batteries 1 are arranged to partially surround sides 4S of the light pipe. This arrangement makes efficient use of the space within housing H, which in turn makes for a compact flashlight 100.

The foregoing disclosure and description of the various embodiments are illustrative and explanatory thereof, and various changes in the components, component configurations, component combinations, circuit elements, circuit configurations, and resulting light paths, as well as in the details of the illustrated circuitry, components and construction and method of operation may be made without departing from the spirit and scope of the invention.

What is claimed is:

1. A flashlight for uniformly illuminating an object to be viewed, comprising:

a light pipe having an input face, an output face, and a plurality of sides;

an array of one or more light-emitting diodes (LEDs) optically coupled to the input face of the light pipe;

an imaging lens arranged adjacent the light pipe output face and at an output end of the flashlight; and one or more batteries operably coupled to the one or more LEDs and arranged adjacent one or more of the sides.

2. The flashlight of claim 1, wherein the imaging lens is adjustable to form an image of the output face of the light pipe at a select distance from the flashlight output end.

3. The flashlight of claim 1, wherein the LED array includes at least two LEDs having a different color.

4. The flashlight of claim 3, wherein the LED array includes at least one red, one green and one blue LED.

5. The flashlight of claim 1, wherein the input face of the light pipe has one or more cavities formed therein and sized to respectively accommodate the one or more LEDs in the LED array.

6. The flashlight of claim 1, wherein the one or more LEDs are dies.

7. The flashlight of claim 1, wherein the one or more LEDs are packaged.

8. The flashlight of claim 1, further including:
an electronic switching circuit electrically coupled to the LED array; and
a switch operably coupled to the switching circuit to activate the switching circuit in order to change the state of the LED array.

9. The flashlight of claim 1, wherein the light pipe constitutes a light pipe assembly comprising:
a first light pipe having a first input end and a first output end; and
one or more secondary light pipes coupled to the main light pipe, with each of the one or more secondary light pipes having a second input end and a second output end; and
wherein the one or more secondary light pipes are coupled to or formed integral with the main light pipe so each second output end is interfaced with the first input end of the main light pipe, and wherein the one or more second input ends constitute said input face.

10. The flashlight of claim 9, wherein:
the first input face of the main light pipe has a first area greater than that of the first output face; and
the second input end of the one or more secondary light pipes has a second area less than that of the second output end.

11. The flashlight of claim 1, further including one or more second LEDs optically coupled to one or more of the plurality of sides of the light pipe.

12. The flashlight of claim 11, wherein one or more of the second LEDs are embedded in at least one of the plurality of sides of the light pipe.

13. A method of forming a flashlight beam to illuminate an object, comprising:
generating light from one or more light-emitting diodes (LEDs);
coupling the light into the a light pipe and outputting uniformized light at an output face of the light pipe;
collecting the outputted light from the light pipe with an imaging lens and directing the outputted light as a flashlight beam; and
bringing the flashlight beam into focus onto the object so as to uniformly illuminate the object by adiusting the imaging lens so as to select a distance at which the flashlight beam forms a uniform image relative to the imaging lens.

14. The method of claim 13, including selectively activating and/or deactivating one or more of the one or more LEDs.

15. The method of claim 13, wherein coupling the light includes embedding at least one of the one or more LEDs into an input face of the light pipe.

16. The method of claim 13, wherein coupling the light includes embedding at least one of the one or more LEDs into a side of the light pipe.

17. The method of claim 13, including:
forming the light pipe from a first light pipe and one or more secondary light pipes coupled to or formed integral with the first light pipe; and
wherein said coupling light into the light pipe includes coupling light into the one or more secondary light pipes and then into the first light pipe.

* * * * *